United States Patent Office 3,274,166
Patented Sept. 20, 1966

3,274,166
MODIFYING HYDROCARBON POLYMERS WITH POLY(DIAZO) COMPOUNDS
David S. Breslow and Harold M. Spurlin, Wilmington, Del., assignors to Hercules Incorporated, a corporation of Delaware
No Drawing. Filed June 19, 1963, Ser. No. 288,896
18 Claims. (Cl. 260—85.1)

This application is a continuation-in-part of application Serial No. 88,314, filed February 10, 1961, now abandoned.

This invention relates to modifying polymers and to the products so produced. More particularly, the invention relates to modifying hydrocarbon polymers with certain poly(diazo) compounds and to the products so produced.

In the past the rubber industry has depended almost entirely upon sulfur or sulfur-bearing materials as vulcanizing, i.e., cross-linking, agents. It has more recently been discovered that certain types of organic peroxides or azo compounds are capable of acting as vulcanizing agents. However, all of the above agents suffer the drawback that because of their mode of action they are not equally effective in cross-linking all types of hydrocarbon polymers. For example, polybutadiene is effectively vulcanized by peroxides while butyl rubber is not.

Now, in accordance with this invention, it has unexpectedly been found that any hydrocarbon polymer can be cross-linked with certain poly(diazo) compounds to produce vulcanizates that are tough, resilient, solvent resistant, and odor free. In addition, it has been found that the hydrocarbon polymers can be treated with smaller amounts of the poly(diazo) compounds to improve their properties without materially affecting their solubility.

The poly(diazo) compounds useful in the process of this invention are selected from the group consisting of

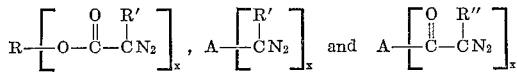

where $x$ is an integer greater than 1, preferably from 2 to 100, R is an organic radical inert to modification reactions, A is an aromatic radical inert to modification reactions, R' is a hydrogen, alkyl, aryl or —COOZ radical where Z is an alkyl or aryl radical and R" is a hydrogen, alkyl or aryl radical. Exemplary of these poly(diazo) compounds are the bis(diazoacetate) ester of 1,6-hexanediol, the bis(diazoacetate) ester of 1,10-decanediol, the tris(diazoacetate) ester of trimethylolethane, the tetra(diazoacetate) ester of pentaerythritol, the bis(diazoacetate) ester of diethylene glycol, the bis(diazoacetate) ester of dioxyethylene sulfide, the bis(diazoacetate) ester of p-hydroxymethyl benzyl alcohol, the tris(α-diazopropionate) ester of trimethylolmethane, the bis(α-diazopropionate) ester of 1,10-decanediol, the bis(α-diazobutyrate) ester of 1,6-hexanediol, the bis(α-diazo-α-phenylacetate) ester of 1,10-decanediol, the bis(α-diazo-α-phenylacetate) ester of hydroquinone, the bis(diazo carbomethoxy acetate) ester of 1,4-butanediol, the bis(diazo carbophenoxy acetate) ester of 1,6-hexanediol, p-bis(diazomethyl) benzene, m-bis(α-diazoethyl) benzene, p - bis(α - diazobutyl) benzene, α,α' - bis(diazo) - α,α'-bis(phenyl) m - xylene, α,α' - bis(diazo) - α,α' - bis (carbomethoxy) p - xylene, α,α' - bis(diazo) - α,α' - bis (carbophenoxy) p - xylene, p - bis(diazoacetyl) benzene, m - bis(α - diazopropionyl) benzene, α,α' - bis(diazo)-α,α' - bis(phenyl) - p - diacetylbenzene, etc. These poly(diazo) compounds can be prepared in various ways as, for example, by diazotizing the corresponding poly(amines).

Instead of using a free poly(diazo) compound as the modifying agent, a precursor that will form one of the above-defined poly(diazo) compounds under conditions of the modification reaction can be used to advantage, particularly in the case where the free diazo compound is unstable. Exemplary precursors are the nitrosoureas, nitrosourethanes, N - nitroso derivatives of mesityl oxideamine adducts, sulfonamides and bis-toluenesulfonohydrazones which have the formulae:

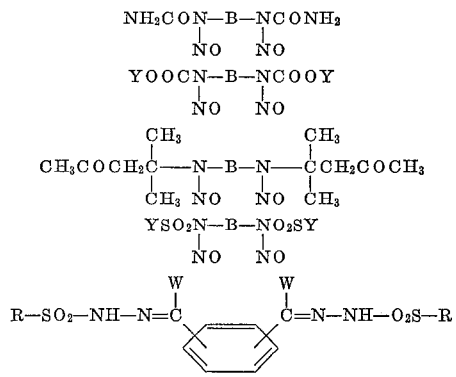

where B is selected from the group consisting of

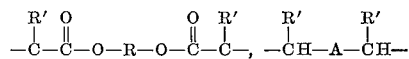
and
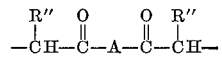

where R, R', A and R" are as defined above, W is hydrogen or a phenyl radical, and Y is an organic radical. Exemplary of these precursors are N,N'-dinitroso-N,N'-dicarbamyl-1,6-hexanediol diglycinate,
m-bis(N-nitroso-N-carbamyl-aminomethyl) benzene,
p-bis(N-nitroso-N-carbamyl-aminoacetyl) benzene,
N,N'-dinitroso-N,N'-dicarbethoxy-1,6-hexanediol diglycinate,
p-bis(N-nitroso-N-carbethoxy-aminomethyl) benzene,
m-bis(N-nitroso-N-carbophenoxy-aminoacetyl) benzene,
1,10-decanediol-bis[N-nitroso-N-(4-keto-2-methyl-2-pentyl) glycinate],
N,N'-dinitroso-N,N'-di-p-toluenesulfonyl-1,6-hexanediol diglycinate,
m-bis(N-nitroso-N-benzenesulfonyl-aminomethyl) benzene,
p-bis(N-nitroso-N-benzenesulfonyl-aminoacetyl) benzene,
terephthalaldehyde-bis(p-toluene sulfonohydrazone),
m-dibenzoylbenzene bis(p-toluenesulfono-hydrazone), etc.

The above-mentioned precursors will readily form poly(diazo) compounds when treated with a base. Exemplary bases which can be used to convert the precursors are the alkali metal hydroxides such as sodium hydroxide, potassium hydroxide, etc.; the alkali metal alkoxides such as lithium ethoxide, sodium methoxide, potassium tert-butoxide, etc.; and certain alkaline metal oxides such as magnesium oxide, zinc oxide, etc. In general, the base will be used in an amount of from about 1 to about 200 mole percent based on the precursor.

Unlike azo compounds which upon heating produce a free radical, diazo compounds liberate nitrogen and produce a carbene, i.e., a carbon containing a sextet of electrons. Therefore, it is believed that the poly(diazo) compounds react by eliminating nitrogen, leaving a carbene group at each end of the molecule. These free carbene groups then react with carbon groups in the hydrocarbon polymer. If the hydrocarbon polymer is saturated, the following type of bond may be formed:

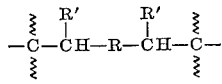

where R and R' are as described above. If the hydrocarbon polymer is unsaturated, the following type of bond may be formed:

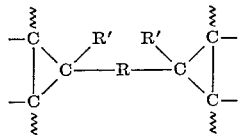

where R and R' are as described above.

From the above it can be seen that any type of hydrocarbon polymer, saturated or unsaturated, as, for example, polyethylene, polypropylene, polystyrene, styrene-butadiene rubber, butyl rubber, natural rubber, polybutadiene, polyisobutylene, ethylene-propylene copolymer, cis-1,4-polyisoprene, ethylene-propylene-dicyclopentadiene terpolymer, etc., and blends of these polymers with each other can be modified with the above-defined poly(diazo) compounds or their precursors.

The modification can be carried out by either heating the hydrocarbon polymer plus the poly(diazo) compound above its decomposition temperature or by exposing the mixture to ultraviolet radiation. Various amounts of the poly(diazo) compound can be added, the optimum amount depending on the amount of cross-linking or other modification desired, the specific poly(diazo) compound employed, etc. In general, the amount added (based on the weight of the polymer) will be from about 0.005% to about 25%, most preferably from about 0.01% to about 20%, and more preferably from about 0.1% to about 20%.

The modifying agent can be incorporated with the polymer in any desired fashion; for example, it can be uniformly blended by simply milling on a conventional rubber mill. By this means the diazo compound is distributed throughout the polymer and uniform cross-linking or other modification is effected when the blend is either subjected to heat or ultraviolet radiation. Other methods of mixing the modifying agent with the polymer will be apparent to those skilled in the art.

The temperature at which modification is effected can be varied over a wide range. When cross-linking or other modification is effected by heating, the temperature will depend on the decomposition temperature of the poly (diazo) compound or precursor. In general, the temperature will be in the range of from about 0° C. to about 250° C.

In addition to the poly(diazo) compound, other ingredients can also be incorporated. The additives commonly used in rubber vulcanizates can be used here also, as, for example, extenders, fillers, pigments, plasticizers, stabilizers, etc. Exemplary of the fillers that can be added are calcium carbonate, iron oxide, carbon black, silica, calcium silicate (hydrated), alumina, etc. When cross-linking or other modification is effected by irradiation, additives should be used in amounts which do not inhibit the passage of the radiation. Obviously, there are many cases in which an additive is not required or desired and excellent results are achieved when only the poly(diazo) compound is added.

The following examples are presented for purposes of illustration, parts and percentages being by weight unless otherwise specified.

The extent to which the polymers are cross-linked is indicated by the percent gain in insolubility in solvents in which the uncross-linked polymer was soluble, hereinafter termed "percent gel." Percent gel is determined as follows: A weighed sample of polymer is soaked in hot toluene for a specified length of time. The sample is then removed and dried to constant weight. The weights of initial and final sample are corrected for polymer and copolymer content based on knowledge of components. From these figures $$\frac{\text{corrected dry weight}}{\text{corrected initial weight}} \times 100 = \text{percent gel}$$

Example 1

This example demonstrates the preparation of some poly(diazo) compounds.

The bis(diazoacetate) esters of 1,6-hexanediol and 1,10-decanediol were prepared by reacting glycinyl chloride hydrochloride with 1,6-hexanediol and 1,10-decanediol, respectively. The intermediate diamines were each treated with aqueous sodium nitrite and 10% sulfuric acid in an ice bath and while under a layer of ether. The ether layer was separated, washed with 5% aqueous sodium carbonate solution, dried with sodium sulfate, and then the ether removed under vacuum. The bis(diazoacetate) ester of 1,6-hexanediol produced was a pale yellow oil having a half-life of 16 minutes at a temperature of 155° C. It was analyzed for percent carbon, hydrogen, and nitrogen. The results of the analysis are given below.

Found: C, 46.8%; H, 5.6%; N, 21.6%. Calculated: C, 47.2%; H, 5.55%; N, 22.0%.

The bis(diazoacetate) ester of 1,10-decanediol produced was a yellow oil. It was analyzed for percent carbon, hydrogen, and nitrogen. The results of the analysis are given below.

Found: C, 54.3%; H, 7.0%; N, 18.1%. Calculated: C, 54.2%; H, 7.15%; N, 18.0%.

Examples 2–8

The two bis(diazoacetates) described in Example 1 were used as cross-linking agents for various hydrocarbon polymers by mixing one or the other with a solution of a polymer in a solvent, removing the solvent by evaporation, and then curing the polymer by heating in an iron mold for a given length of time at a given temperature. The polymers cross-linked, the solvents in which they were dissolved, the bis(diazoacetate) used, the parts of cross-linking agent per 100 parts of polymer, the temperature and time of curing, and the amount of cross-linking (recorded as percent gel) are listed in Table 1.

TABLE 1

| Example No. | Polymer | Cross-linking Agent | Solvent | Parts of Cross-linking Agent/100 Parts of Polymer | Temp., ° C. | Time, min. | Percent Gel |
|---|---|---|---|---|---|---|---|
| 2 | Natural rubber | Bis(diazoacetate) ester of 1,6-hexanediol | Trichloroethylene | 3 | 180 | 20 | 90 |
| 3 | ____do____ | ____do____ | ____do____ | 5 | 180 | 25 | 96 |
| 4 | Ethylene-propylene copolymer containing 32 mole percent propylene. | ____do____ | ____do____ | 5.8 | 175–185 | 20 | 60 |
| 5 | ____do____ | Bis(diazoacetate) ester of 1,10-decanediol | ____do____ | 4.5 | 175–180 | 30 | 66 |
| 6 | ____do____ | ____do____ | ____do____ | 12 | 185 | 30 | 76 |
| 7 | Natural rubber | ____do____ | ____do____ | 5 | 180 | 25 | 95 |
| 8 | Styrene-butadiene rubber containing 25 mole percent styrene. | ____do____ | Chlorobenzene | 5.9 | 175–180 | 20 | 89 |

Example 9

Natural rubber (smoked sheet #1) was compounded with carbon black, stearic acid, zinc oxide, and the bis(diazoacetate) ester of 1,10-decanediol, described in Example 1, on a 2-roll mill at 80° C. for 10 minutes and then heated at 175° C. for 30 minutes under a pressure of 1000 p.s.i. The composition used is tabulated below:

| Composition: | Parts |
|---|---|
| Natural rubber | 100 |
| High abrasion furnace black | 50 |
| Stearic acid | 1 |
| Zinc oxide | 5 |
| Bis(diazoacetate) ester of 1,10-decanediol | 5 |

The resulting vulcanizate was a strong, tough rubber.

Example 10

To 100 parts of styrene-butadiene copolymer (GRS 1500) were added 50 parts of high abrasion furnace black, 1 part of stearic acid, 5 parts of zinc oxide, and 5 parts of the bis(diazoacetate) ester of 1,10-decanediol of Example 1. This mixture was blended on a 2-roll mill at 80° C. for 10 minutes and then heated between steel plates at a temperature of 175° C. and a pressure of 1000 p.s.i. for 30 minutes. The resulting vulcanizate was a strong, tough rubber.

Example 11

To a slurry of high-density polyethylene in benzene was added sufficient solution of the bis(diazoacetate) ester of 1,6-hexanediol, of Example 1, dissolved in benzene to make a slurry containing 3 parts of diazo compound per 100 parts of polymer. The slurry was dried overnight at room temperature and the resulting powder pressed between steel plates at a temperature of 175° C. and a pressure of 1000 p.s.i. for 30 minutes. The film thus formed was substantially insoluble in hot decahydronaphthalene. The same procedure was carried out with polypropylene with the same results.

Examples 12 and 13 p-Bis(diazoacetyl) benzene was used in two compositions to cross-link ethylene-propylene copolymers.

Example 12:

| | Parts |
|---|---|
| Ethylene-propylene copolymer (32 mole percent propylene) | 100 |
| p-Bis(diazoacetyl) benzene | 5 |

This composition was blended on a 2-roll mill at 80° C. and then cured for 60 minutes at 175° C. under 1000 p.s.i. pressure. The resulting vulcanizate was a strong, tough rubber, substantially insoluble in toluene.

Example 13:

| | Parts |
|---|---|
| Ethylene-propylene copolymer (33 mole percent propylene) | 100 |
| High abrasion furnace black | 50 |
| p-Bis(diazoacetyl) benzene | 5 |

This composition was blended on a 2-roll mill at 80° C. and then cured between steel plates under a pressure of 1000 p.s.i. for 30 minutes at 175° C. The resulting vulcanizate was a tough, resilient rubber, substantially insoluble in toluene.

Example 14

The tris(diazoacetate) ester of trimethylolethane was prepared from trimethylolethane by the method described in Example 1. The resulting tris(diazo) compound was a yellow viscous oil.

Natural rubber was compounded with 5 parts per hundred of the above-described tris(diazo) compound on a 2-roll mill at 80° C. for 12 minutes. The composition was cured at a temperature of 180° C. for 25 minutes under a pressure of 1000 p.s.i. The resulting vulcanizate had a percent gel of 93.

Example 15

Meta-bis($\alpha$-diazoethyl) benzene, $C_6H_4(CN_2-CH_3)_2$, was prepared by dissolving the bis(hydrazone) of m-diacetyl benzene in toluene, cooling in an ice bath, and then treating with yellow mercuric oxide.

The above bis(diazo) compound was used in the following composition to cross-link styrene-butadiene rubber (SBR):

| Composition: | Parts |
|---|---|
| Styrene-butadiene rubber | 100 |
| High abrasion furnace black | 50 |
| Stearic acid | 1 |
| Zinc oxide | 5 |
| m-Bis($\alpha$-diazoethyl) benzene | 5 |

The resulting vulcanizate was a strong, tough rubber.

Example 16

This example illustrates the use of a bis-toluenesulfonohydrazone precursor in the cross-linking of an ethylene-propylene copolymer containing 32 mole percent propylene.

Terephthalaldehyde bis(p-toluenesulfonohydrazone) was prepared by reacting terephthalaldehyde with p-toluenesulfonohydrazine in an aqueous hydrochloric acid medium.

A solution of 1 part of terephthalaldehyde bis(p-toluenesulfonohydrazone) in dry dimethylformamide was prepared. To the ssolution was added 1.5 parts of potassium tert-butoxide and a bright yellow suspension formed. The suspension was added to a solution of the ethylene-propylene copolymer in toluene with vigorous agitation. The resulting suspension contained approximately 10 parts of the bis-toluenesulfonohydrazone per 100 parts of copolymer. The solvents were removed under vacuum and the resulting mixture was cured in a closed iron mold for 1 hour at a temperature of 177° C. The resulting vulcanizate had a percent gel of 96.

Examples 17 and 18

These examples illustrate the use of different bis-toluenesulfonohydrazones) in the cross-linking of a styrene-butadiene rubber containing 25 mole percent styrene.

Two samples of the styrene-butadiene rubber were cross-linked following the procedure described in Example 16. In Example 17 the rubber was cross-linked with 20 parts of the terephthalaldehyde bis(p-toluenesulfonohydrazone) (described in Example 16) per 100 parts of rubber. The procedure was exactly the same as described in Example 16 except that the rubber was cured at a temperature of 200° C. The resulting vulcanizate had a percent gel of 92. The styrene-butadiene rubber of Example 18 was cross-linked with 25 parts of m-dibenzoylbenzene bis(p-toluenesulfonohydrazone) also following the procedure of Example 16 except that it was cured at a temperature of 200° C. The resulting vulcanizate had a percent gel of 92.

Example 19

To a slurry of crystalline polypropylene in benzene was added sufficient bis($\alpha$-diazopropionate) ester of 1,6-hexanediol dissolved in benzene to make a slurry containing 5 parts of diazo compound per 100 parts of polymer. The slurry was dried overnight at room temperature and the resulting powder pressed between steel plates at a temperature of 175° C. and a pressure of 800 p.s.i. for 30 minutes. The film thus formed was substantially insoluble in hot decahydronaphthalene.

Example 20

To a solution of an ethylene-propylene copolymer, containing 32 mole percent propylene, in benzene was added sufficient bis(diazoacetate) ester of 1,10-decanediol to make a solution containing 10 parts of diazo compound per 100 parts of polymer. The solvent was removed under vacuum and the resulting mixture exposed to an ultraviolet light source under an atmosphere of nitrogen for one hour at a temperature of 20° C. Quartz equipment was used throughout the reaction. The resulting vulcanizate had a percent gel of 78.

*Example 21*

To a slurry of crystalline polypropylene in benzene was added sufficient bis(diazoacetate) ester of 1,10-decanediol dissolved in benzene to make a slurry containing 0.075 part of diazo compound per 100 parts of polymer. The slurry was dried overnight at room temperature and the resulting powder pressed between steel plates at a temperature of 175° C. and a pressure of 800 p.s.i. for 30 minutes. The film thus formed was superior to polypropylene treated in the exact same way except for the addition of diazo compound, in higher density, greater strength and lower permeability to gases and liquids. Both the modified and unmodified samples dissolved in hot decahydronaphthalene. It can be seen from this example that poly(diazo) compounds can be used to impart improved properties to films without materially affecting their solubility.

*Example 22*

A solution of 10 parts of terephthalaldehyde bis(p-toluenesulfonohydrazone) in dry dimethylformamide was prepared. To the solution was added 15 parts of sodium ethoxide and a bright yellow suspension formed. The suspension was added to a solution of 100 parts of polyisobutylene in toluene with agitation. The solvents were removed under vacuum and the resulting mixture was heated in a closed iron mold for one hour at a temperature of 180° C. The resulting vulcanizate was substantially insoluble in toluene.

*Example 23*

A sulfonamide precursor was prepared by reacting 2 moles of p-toluenesulfonyl chloride with 1 mole of 1,3-bis(aminomethyl)benzene in ethanol containing 2 moles of triethylamine. An ether solution of the intermediate bis(p-toluenesulfonamide) was treated with aqueous sodium nitrite (2 moles) and 10% sulfuric acid. The ether layer was separated, washed with dilute aqueous sodium carbonate and dried over magnesium sulfate. Removal of the ether and recrystallization of the yellow solid thus obtained yielded m-bis(N-nitroso-N-p-toluenesulfonyl-aminomethyl) benzene. It was analyzed for percent carbon, hydrogen and nitrogen. The results of the analysis are given below.

Found: C, 52.1%; H, 4.29%; N, 11.4%. Calculated: C, 52.6%; H, 4.41%; N, 11.2%.

To a solution of an ethylene-propylene copolymer, containing 32 mole percent propylene, in benzene was added a sufficient amount of the precursor and potassium tert-butoxide to make a solution containing 10 parts of precursor and 5 parts of butoxide per 100 parts of polymer. The solvent was removed under vacuum and the mixture heated in a closed iron mold for 1 hour at a temperature of 190° C. under a pressure of 800 p.s.i. The resulting vulcanizate was substantially insoluble in benzene.

What we claim and desire to protect by Letters Patent is:

1. The process of modifying a hydrocarbon polymer which comprises heating said polymer in admixture with from about 0.01% to about 20% based on the weight of the polymer of a poly(diazo) compound selected from the group consisting of

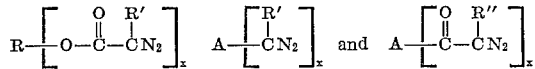

where $x$ is an integer from 2 to 4, R is an organic radical inert to modification reactions, A is an aromatic radical inert to modification reactions, R' is selected from the group consisting of hydrogen, alkyl, aryl and —COOZ radicals where Z is selected from the group consisting of alkyl and aryl radicals and R'' is selected from the group consisting of hydrogen, alkyl and aryl radicals said heating being at the decomposition temperature of said poly(diazo) compound whereby chemical bonding is effected between the polymer molecules.

2. The process of modifying a hydrocarbon polymer which comprises irradiating said polymer under ultraviolet radiation in admixture with from about 0.01% to about 20% based on the weight of the polymer of a poly(diazo) compound selected from the group consisting of

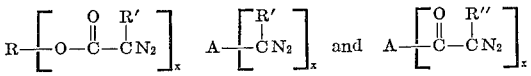

where $x$ is an integer from 2 to 4, R is an organic radical inert to modification reactions, A is an aromatic radical inert to modification reactions, R' is selected from the group consisting of hydrogen, alkyl, aryl and —COOZ radicals where Z is selected from the group consisting of alkyl and aryl radicals and R'' is selected from the group consisting of hydrogen, alkyl and aryl radicals.

3. The process of claim 1 wherein the poly(diazo) compound is a diazoacetate ester of an alkane polyol.

4. The process of claim 3 wherein the diazoacetate ester is the bis(diazoacetate) ester of 1,6-hexanediol.

5. The process of claim 3 wherein the diazoacetate ester is the bis(diazoacetate) ester of 1,10-decanediol.

6. The process of claim 1 wherein the poly(diazo) compound is p-bis(diazoacetyl) benzene.

7. The process of claim 1 wherein the poly(diazo) compound is m-bis(α-diazoethyl) benzene.

8. The process of claim 1 wherein the hydrocarbon polymer is cross-linked by said modification.

9. The process of modifying a hydrocarbon polymer which comprises heating said polymer in admixture with a base selected from the group consisting of alkali metal hydroxides, alkali metal alkoxides and alkaline earth oxides and from about 0.005% to about 25% based on the weight of the polymer of a poly(diazo) precursor selected from the group consisting of nitrosoureas, nitrosourethanes, N-nitroso derivatives of mesityl oxide-amine adducts, sulfonamides and bis-toluene-sulfonohydrazones which forms a poly(diazo) compound selected from the group consisting of

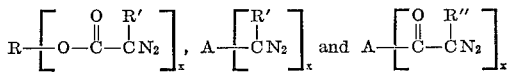

where $x$ is an integer from 2 to 100, R is an organic radical inert to modification reactions, A is an aromatic radical inert to modification reactions, R' is selected from the group consisting of hydrogen, alkyl, aryl and —COOZ radicals where Z is selected from the group consisting of alkyl and aryl radicals and R'' is selected from the group consisting of hydrogen, alkyl and aryl radicals, said heating being at the decomposition temperature of said poly(diazo) compound whereby chemical bonding is effected between the polymer molecules.

10. The process of modifying a hydrocarbon polymer which comprises irradiating said polymer under ultraviolet radiation in admixture with a base selected from the group consisting of alkali metal hydroxides, alkali metal alkoxides and alkaline earth oxides and from about 0.005% to about 25% based on the weight of the polymer of a poly(diazo) precursor selected from the group consisting of nitrosoureas, nitrosourethanes, N-nitroso derivatives of mesityl oxide-amine adducts, sulfonamides and bis-toluene-sulfonohydrazones which forms a poly(diazo) compound selected from the group consisting of

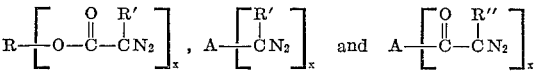

where $x$ is an integer from 2 to 100, R is an organic radical inert to modification reactions, A is an aromatic radical inert to modification reactions, R' is selected from the group consisting of hydrogen, alkyl, aryl and —COOZ radicals where Z is selected from the group consisting of alkyl and aryl radicals and R" is selected from the group consisting of hydrogen, alkyl and aryl radicals whereby chemical bonding is effected between the polymer molecules.

11. A hydrocarbon polymer modified by reacting with from about 0.005% to about 25% based on the weight of the polymer of a poly(diazo) compound selected from the group consisting of

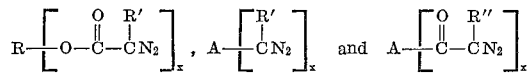

where $x$ is an integer from 2 to 100, R is an organic radical inert to modification reactions, A is an aromatic radical inert to modification reactions, R' is selected from the group consisting of hydrogen, alkyl, aryl and —COOZ radicals where Z is selected from the group consisting of alkyl and aryl radicals and R" is selected from the group consisting of hydrogen, alkyl and aryl radicals said reaction having been initiated by heating said polymer in admixture with said poly(diazo) compound at the decomposition temperature of said poly(diazo) compound so as to effect chemical bonding between the polymer molecules.

12. A hydrocarbon polymer modified by reacting with from about 0.005% to about 25% based on the weight of the polymer of a poly(diazo) compound selected from the group consisting of

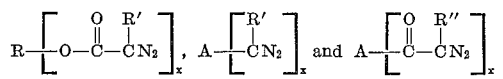

where $x$ is an integer from 2 to 100, R is an organic radical inert to modification reactions, A is an aromatic radical inert to modification reactions, R' is selected from the group consisting of hydrogen, alkyl, aryl and —COOZ radicals where Z is selected from the group consisting of alkyl and aryl radicals and R" is selected from the group consisting of hydrogen, alkyl and aryl radicals said reaction having been initiated by irradiating said polymer in admixture with said poly(diazo) compound under ultraviolet radiation so as to effect chemical bonding between the polymer molecules.

13. The product of claim 11 wherein the hydrocarbon polymer is natural rubber.

14. The product of claim 11 wherein the hydrocarbon polymer is styrene-butadiene rubber.

15. The product of claim 11 wherein the hydrocarbon polymer is ethylene-propylene copolymer.

16. The product of claim 11 wherein the hydrocarbon polymer is polypropylene.

17. The product of claim 11 wherein the hydrocarbon polymer is polyethylene.

18. The product of claim 11 wherein the hydrocarbon polymer is polyisobutylene.

References Cited by the Examiner

UNITED STATES PATENTS

| | | | |
|---|---|---|---|
| 2,469,819 | 5/1949 | Flory et al. | 260—94.9 |
| 2,830,978 | 4/1958 | Muller et al. | 260—94.9 |
| 3,012,020 | 12/1961 | Kirk et al. | 260—94.9 |
| 3,058,944 | 10/1962 | Breslow et al. | 260—88.2 |
| 3,152,107 | 10/1964 | Mullier et al. | 260—94.9 |

FOREIGN PATENTS 718,906   11/1954   Great Britain.

OTHER REFERENCES

Journal of Organic Chemistry, vol. 21, pages 1013–1021, 1956. Also see C.A., 52, 1958, 7279–C.

JOSEPH L. SCHOFER, *Primary Examiner.*

J. A. SEIDLECK, *Assistant Examiner.*